No. 623,485. Patented Apr. 18, 1899.
V. C. LUPPERT.
RELISHING ATTACHMENT FOR TENONING MACHINES.
(Application filed Nov. 5, 1898.)
(No Model.) 2 Sheets—Sheet 1.
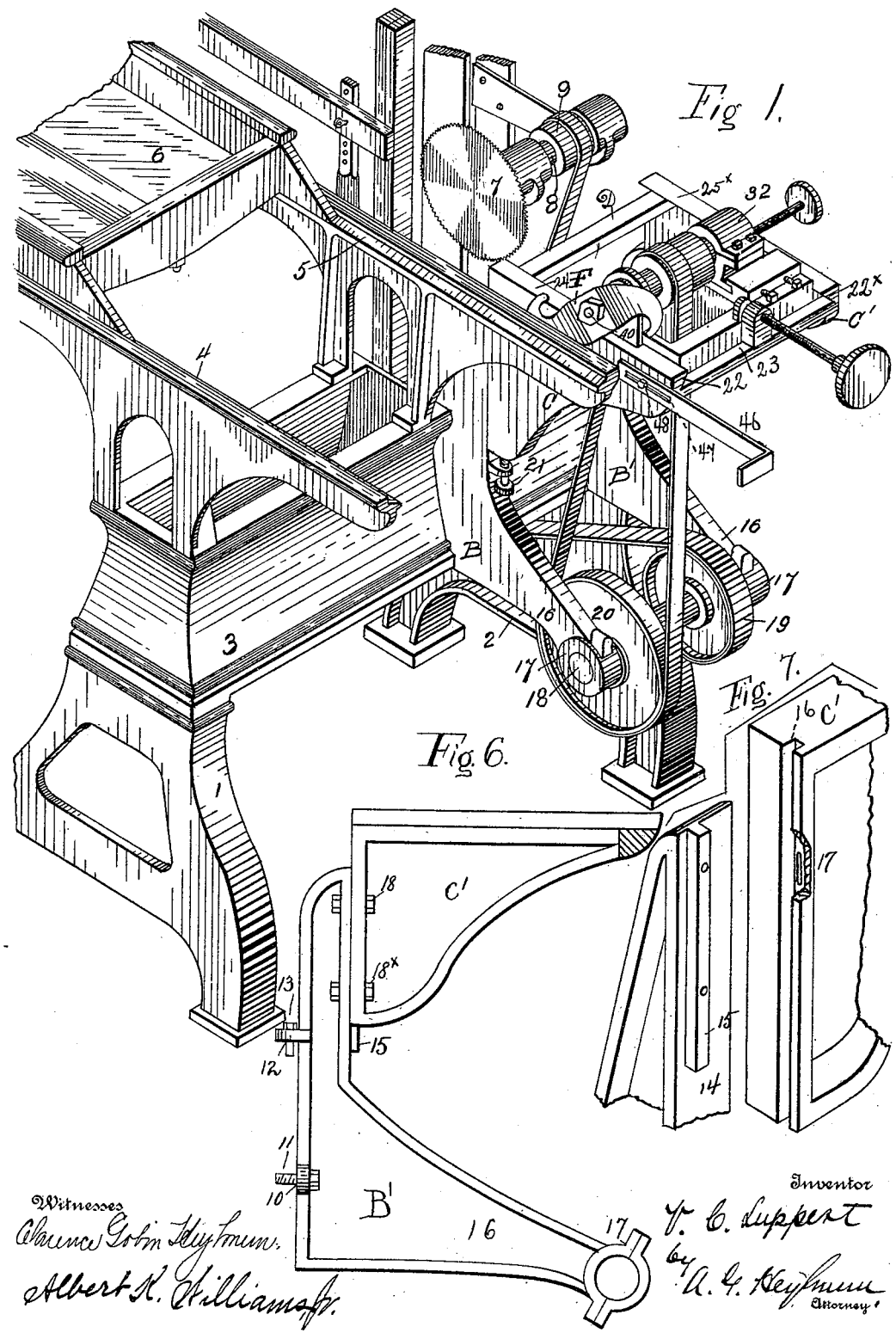

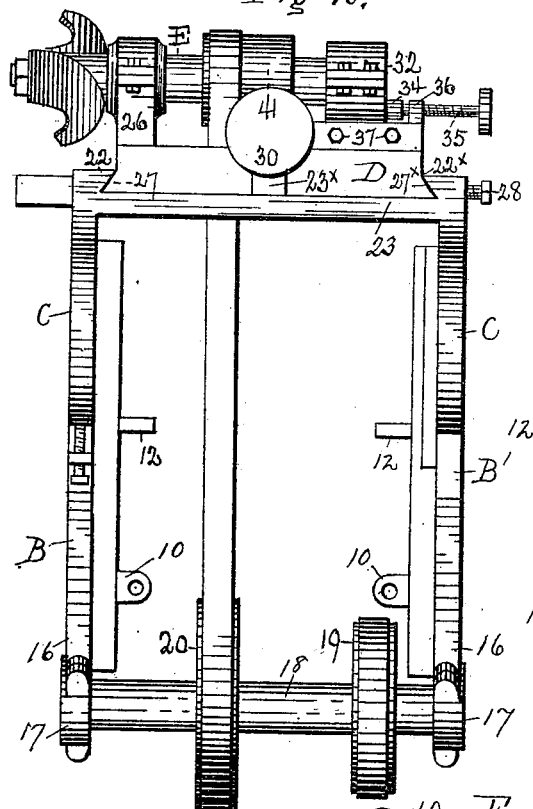

UNITED STATES PATENT OFFICE.

VALENTINE C. LUPPERT, OF SOUTH WILLIAMSPORT, PENNSYLVANIA.

RELISHING ATTACHMENT FOR TENONING-MACHINES.

SPECIFICATION forming part of Letters Patent No. 623,485, dated April 18, 1899.

Application filed November 5, 1898. Serial No. 695,576. (No model.)

*To all whom it may concern:*

Be it known that I, VALENTINE C. LUPPERT, a citizen of the United States of America, residing in South Williamsport, in the county of Lycoming and State of Pennsylvania, have invented certain new and useful Relishing Attachments for Tenoning-Machines, of which the following is a specification.

My invention has relation to improvements in relishing attachments for tenoning-machines; and the object is to combine and connect or associate with a machine for cutting, sawing, or otherwise forming tenons on the ends of boards and similar objects and articles a machine for cutting a relish on the tenon to facilitate and expedite the insertion of the tenon in a mortise, the operation of forming the tenon and cutting the relish being consecutively accomplished by the continuous progressive movement of the table or carriage on which the stuff is carried beyond the tenon cutter or saw, as will be hereinafter fully described and the novelty claimed particularly pointed out.

I have fully and clearly illustrated the invention in the accompanying drawings, wherein—

Figure 1 is a perspective of a well-known type of tenoning-machine, certain parts being broken away and others not deemed essential to the present purposes being omitted and the relishing attachment being shown in operative relation to the rear saw. Fig. 2 is a detail end view of the movable carriage of the relish attachment, showing the connection with the supporting-brackets and the means for adjusting the cutter-spindle lengthwise. Fig. 3 is a plan view of the carriage with the adjustable box, spindle, and cutter, the cutter being shown in edge view. Fig. 4 is a detail edge and face view, respectively, of the cutter. Fig. 5 is a side view in detail of the carriage, showing the means for adjusting the movable carriage on a larger scale than that indicated in Fig. 1. Fig. 6 is a side view of suitable supporting-brackets, showing their connections from the inner side and means for raising and lowering the upper brackets which carry the spindle and cutter. Fig. 7 shows details of the interlocking flanges of the brackets. Fig. 8 is a detail view, partly in section, of the movable bearing for the relish-shaft, showing the means for holding the shaft against longitudinal movement in the bearing and the means for moving the bearing with the shaft longitudinally.

In the drawings I have illustrated the body-frame of a tenoning-machine, comprising supports 1 2 and body 3, on which are carried carriage tracks or rails 4 5, upon which is mounted a movable table 6, on which the stuff is laid to be moved into contact with the saws or cutters, which form the tenons in a well-known manner. The rear and upper tenon saw or cutter 7 is here shown as mounted on a spindle 8, carried in bearings formed or disposed in arms or brackets projected from the frame of the tenoning-machine, and on the cutter-spindle is a pulley 9, on which a belt (not shown) may be arranged, which belt has connection with a driving-pulley (not shown) in some convenient place in the frame of the machine. The end of the board or piece to be acted on by the saw or cutter projects inward a determined distance in the path of the cutters to form the tenon.

Any suitable supporting-brackets may be employed for sustaining in operative relation the relishing mechanism; but for the purpose of suitably connecting the relishing mechanism to the tenoning-machine, so that the tenon may be relished without removal of the board from the table, I have devised and provided brackets of the following-described construction: B B' designate the lower sections or parts of the supporting-brackets, formed vertical at the rear portion or edge and having an ear or lug 10 at the lower portion to receive a clamping-bolt 11, adapted to engage or project through or into a hole or socket in the frame of the tenoning-machine to which the bracket is to be attached, and at the upper end of the vertical edge is formed a step 12, which takes over and rests on the top edge of the rail of the machine and is held in such position by a bolt 13, let into the top of the rail. Along the outer edge of the rail of the outer vertical face of the bracket B is formed a lateral flange 14, having a tongue 15 extending the length thereof, as indicated in Fig. 7 of the drawings, to engage in the corresponding groove of the upper carriage-brackets, and in the flange 14 are formed upper and lower threaded bolt-holes. From the lower portions of the brackets B B' project arms or hangers 16, provided with suitable bearings 17 at their ends, in which is journaled a shaft 18, carrying pulleys 19 20, the former of which has connection to a driving-pulley (not shown) and the latter connected to the pulley of the relish-spindle to operate the relish-cutter. The brackets B B' are duplicates in construction and configuration, except that the guiding flange or tongue 15 may be on one of them only, the purpose of guiding the upper frame or brackets being accomplished by a flange on one, and of course the engaging tongue on the upper or carriage bracket may be formed on one of them only. The other brackets not having the tongue and groove are held in relative position by coincident flanges with clamping-bolts through them.

C C' designate the upper bracket-frame, on which the relish-cutter mechanism and carriage are mounted. This bracket-frame comprises oppositely-disposed brackets arranged at the proper distance apart and duplicates in general construction and outline or contour, having straight vertical rear sides or faces, and one of which is formed with a vertical groove 16 to fit over the tongue of the lower bracket and having elongated bolt-holes 17 $17^\times$ at the upper and lower portions of the lateral flanges, through which the clamping-bolts 18 $18^\times$ are projected. This construction, it will be perceived, permits the vertical adjustment of the upper brackets. By loosening the clamping-bolts and then moving the upper bracket-frame to the point desired the bolts can be tightened up, and the bracket-frame will be held fixed in the position. To adjust the upper bracket-frame to the desired position, a threaded lug 19 is formed on the lower bracket B and an adjusting-screw 20 fitted therein, which bears with its upper end against the lower end of the upper bracket, as shown, a suitable hand-wheel 21 or equivalent means being provided and fixed to the screw to operate the same. It will be perceived that by loosening the clamping-screws holding the brackets together the upper ones may be raised or lowered by corresponding movements of the screw 20. The upper faces of the arms of the brackets C C' are in horizontal alinement and formed with gibs 22 $22^\times$ on their inner faces adjacent to the tops, constituting tracks for holding and guiding the carriage of the relishing machine or attachment. The outer ends of the brackets C C' are rigidly connected by a cross-piece 23, secured thereto or formed integral therewith.

D designates the relish-carriage, consisting of a rectangular frame made up of parallel side pieces or plates 24 $24^\times$ and end pieces 25 $25^\times$, the latter being formed with a spindle-bearing 26 and having on its under face gibbed flanges 27 $27^\times$ engaging with the gibs 22 $22^\times$ of the brackets and slidingly arranged in said gibs and locked and held in any determined position in the tracks by means of set-screws 28, let through from the side of the bracket-arm to bear with their inner ends against the edge of the gib on the relish-carriage, as indicated in the drawings. The carriage D is moved to any desired point on its track and adjusted to suit the width of the stuff on which the relish is to be formed by the following-described means: Let through the cross-piece 23 of the bracket-frames C C' or through a threaded aperture in a projection or lug $23^\times$ thereon is a threaded adjusting-rod 29, provided with a hand-wheel 30 on its outer end to operate the rod and having its inner end suitably connected to the end cross-piece of the carriage, substantially as shown, so that by turning the rod the carriage will be correspondingly moved in the desired direction, and this being attained the clamping-screws are screwed up to hold it in position.

The spindle carrying the relish cutter or knife must be made adjustable to suit the cut required, and to accomplish this parallel gibbed flanges 31 $31^\times$ are formed on the side arms of the carriage, in which the coincident flanges on a movable bearing-box 32 slidingly engage. The bearing-seat in this bearing-box 32 is formed with annular grooves 33, as shown in Fig. 8 of the drawings, and on the under face of the box 32 is an apertured lug 34, in which the end of a threaded adjusting-rod 35 has suitable engagement, the body of the rod having threaded connection in a lug 36 on the cross-bar at the end of the carriage, and the box is clamped and held in any determined position by means of set-screws 37, let through one of the flanges on the carriage, substantially as shown in the drawings.

E designates the spindle which carries the relish cutter or knife. This spindle has its bearing in the box or bearing 26 and is held therein by a cap over the box, as usual, and at this portion is made smooth to fit the bearing for a greater distance than the length of the box, so as to be movable lengthwise in its bearing at this part to accommodate the adjustment of the cutter, and at the rear end at that part journaled in the movable box 32 is formed with annular thrust-rings 38 to engage in the grooves of the movable box and be held therein, so that the spindle will be moved lengthwise by the adjustments of the box. The cutter end of the spindle is formed with a collar 39 and threaded projecting end portion 40, on which the cutter F is secured by the usual fastening-nuts, substantially as shown in the drawings. The cutter F consists of a steel blade substantially S shape in face view, the wings or blades tapering to give the proper shearing stroke and bent or directed inward at the proper angle to conform to the angle of the relish to be formed, being made so as to cut at about forty-five degrees or more edgewise, thus preventing the breaking or splintering of the tenon. On the spindle F is a pulley 41, made long enough to accommodate the position of the belt to all adjustments of the spindle lengthwise. A belt 42 connects the pulley 41 with the pulley 20 in the hanger below.

To stop the table or carriage of the tenoning-machine from being moved too far past the cutter-table, and thus cause the cutter to clip the relish too far on the tenon, an adjustable stop-bar 46 is connected to the machine-frame, substantially as shown, the stem of the stop-bar being slotted, as at 47, so as to be movable lengthwise when loosened, and the clamping screws or bolts 48 clamp and hold the bar in place. The outer end of the stop-bar is turned at right angles to the stem, as at 49, the turned-in part being in the path of the table, so that the table will contact therewith at the proper time and point.

The use and operation of the invention may be stated as follows: The lower hangers or brackets may be first placed and secured in position and the spindle with the driving-pulleys mounted thereon arranged and secured in the bearings of the hangers. The upper bracket-frame is then placed in position and the clamping-bolts inserted with sufficient tension or force to hold it in position for the time being. The relishing-carriage can then be slipped in or on its tracks. The spindle of the cutter with the cutter thereon can then be mounted and secured, and then by means of the adjusting-screw in the lower brackets and at the base of the upper brackets the latter can be adjusted to bring the carriage in the proper vertical position with the relish-cutter in operative place. The adjusting-rods can then be applied and the carriage spindle and cutter all be adjusted, as and for the purposes heretofore stated. In order that the cutter shall strike the relish off square, the center of the cutter must aline with the center of the tenon. After the attachment has been fixed in position and the parts of the operating mechanism adjusted to suit the parts of the tenoning-machine with which they coöperate and the tenons to be relished all that is necessary is to move the table of the tenoning-machine with the tenoned stuff thereon forward past the rear tenon-cutter and into the path of the relish-cutter.

What I claim is—

1. In combination with the feed-table of a tenoning-machine, a relish-cutter comprising a vertically-adjustable support formed with a gibbed track, a carriage having flanges to engage the gibs of the track and slidingly mounted thereon, means to move the carriage back and forth on its track, a fixed bearing on the carriage, a longitudinally-movable bearing on the carriage, means to move the bearing longitudinally, a spindle journaled in the bearings and parallel with said table movable longitudinally in the fixed bearing and held in the movable bearing against longitudinal movement therein, and a relish-cutter on the spindle, substantially as described.

2. In combination with a tenoning-machine, a relish-cutter comprising a vertically-adjustable supporting-bracket formed with a gibbed track, a carriage having flanges to engage the track and movable thereon, and having a fixed bearing formed at one end and gibbed flanges at the other end, a bearing slidingly secured in the gibbed flanges, a spindle in the said bearings movable lengthwise through the fixed bearing, and secured against lengthwise movement in the movable bearing, a relish-cutter on the spindle, means to move the carriage toward and from the tenoning-cutters and means to move the movable bearing with the spindle in the direction of the length thereof, substantially as described.

In testimony whereof I have affixed my signature in presence of two witnesses.

VALENTINE C. LUPPERT.

Witnesses:
HUGH GILMORE,
LaRue Munson.